(12) United States Patent
Markoski et al.

(10) Patent No.: US 9,065,095 B2
(45) Date of Patent: Jun. 23, 2015

(54) METHOD AND APPARATUS FOR ENHANCING POWER DENSITY OF DIRECT LIQUID FUEL CELLS

(75) Inventors: Larry J. Markoski, Raleigh, NC (US); Dilip Natarajan, Wilmington, DE (US)

(73) Assignee: INI Power Systems, Inc., Morrisville, NC (US)

( * ) Notice: Subject to any disclaimer, the term of this patent is extended or adjusted under 35 U.S.C. 154(b) by 0 days.

(21) Appl. No.: 13/334,929

(22) Filed: Dec. 22, 2011

(65) Prior Publication Data

US 2012/0301799 A1    Nov. 29, 2012

Related U.S. Application Data

(60) Provisional application No. 61/430,035, filed on Jan. 5, 2011.

(51) Int. Cl.
*H01M 8/22* (2006.01)
*H01M 8/04* (2006.01)
*H01M 8/10* (2006.01)

(52) U.S. Cl.
CPC ........ *H01M 8/04141* (2013.01); *H01M 8/1011* (2013.01); *Y02E 60/523* (2013.01)

(58) Field of Classification Search
CPC .......................... H01M 8/1011; H01M 8/1013
USPC ....................................................... 429/414
See application file for complete search history.

(56) References Cited

U.S. PATENT DOCUMENTS

| | | |
|---|---|---|
| 3,357,861 A | 12/1967 | Hunger |
| 3,731,846 A | 5/1973 | Turner et al. |
| 3,992,223 A | 11/1976 | Gutbier |
| 4,614,575 A | 9/1986 | Juda et al. |
| 4,722,773 A | 2/1988 | Plowman et al. |
| 4,732,822 A | 3/1988 | Wright et al. |
| 4,783,381 A | 11/1988 | Tytgat et al. |
| 5,290,414 A | 3/1994 | Marple |
| 5,316,629 A | 5/1994 | Clifford et al. |
| 5,599,638 A | 2/1997 | Surampudi et al. |
| 5,846,670 A | 12/1998 | Watanabe |
| 6,007,931 A | 12/1999 | Fuller et al. |
| 6,013,385 A | 1/2000 | DuBose |
| 6,024,848 A | 2/2000 | Dufner et al. |

(Continued)

FOREIGN PATENT DOCUMENTS

| | | |
|---|---|---|
| CA | 2 473 329 | 10/2009 |
| EP | 0 252 559 | 6/1991 |

(Continued)

OTHER PUBLICATIONS

Chen et al., "Ion exchange resin/polystyrene sulfonate composite membranes for PEM fuel cells", Journal of Membrane Science, 243, pp. 327-333, 2004.

(Continued)

*Primary Examiner* — Stewart Fraser
*Assistant Examiner* — Olatunji Godo
(74) *Attorney, Agent, or Firm* — Evan Law Group LLC (57) ABSTRACT

A fuel cell includes a direct liquid fuel cell and a humidifier. The direct liquid fuel cell includes an air intake channel for providing oxidant to the fuel cell and an exhaust channel for exhausting depleted oxidant. The humidifier forms a fluid connection between the air intake channel and the exhaust channel.

19 Claims, 8 Drawing Sheets

(56) References Cited

U.S. PATENT DOCUMENTS

| | | |
|---|---|---|
| 6,039,853 A | 3/2000 | Gestermann et al. |
| 6,103,413 A | 8/2000 | Hinton et al. |
| 6,110,613 A | 8/2000 | Fuller |
| 6,136,272 A | 10/2000 | Weigl et al. |
| 6,209,738 B1 | 4/2001 | Jansen et al. |
| 6,255,012 B1 | 7/2001 | Wilson et al. |
| 6,444,343 B1 | 9/2002 | Prakash et al. |
| 6,447,943 B1 | 9/2002 | Peled et al. |
| 6,460,733 B2 | 10/2002 | Acker et al. |
| 6,472,090 B1 * | 10/2002 | Colbow et al. ................ 429/443 |
| 6,485,851 B1 | 11/2002 | Narayanan et al. |
| 6,492,047 B1 | 12/2002 | Peled et al. |
| 6,528,200 B1 | 3/2003 | Yoshitake et al. |
| 6,638,654 B2 | 10/2003 | Jankowksi et al. |
| 6,641,948 B1 | 11/2003 | Ohlsen et al. |
| 6,713,206 B2 | 3/2004 | Markoski et al. |
| 6,715,899 B1 | 4/2004 | Wu |
| 6,716,548 B1 | 4/2004 | Kaliaguine et al. |
| 6,720,105 B2 | 4/2004 | Ohlsen et al. |
| 6,727,016 B2 | 4/2004 | Bostaph et al. |
| 6,808,840 B2 | 10/2004 | Mallari et al. |
| 6,811,916 B2 | 11/2004 | Mallari et al. |
| 6,852,443 B1 | 2/2005 | Ohlsen |
| 6,871,844 B2 | 3/2005 | Yan et al. |
| 6,875,535 B2 | 4/2005 | Ye et al. |
| 6,890,680 B2 | 5/2005 | Beckmann et al. |
| 6,893,763 B2 | 5/2005 | Fan et al. |
| 6,911,411 B2 | 6/2005 | Cox et al. |
| 6,924,058 B2 | 8/2005 | Ohlsen et al. |
| 6,960,285 B2 | 11/2005 | Schoeniger et al. |
| 6,994,932 B2 | 2/2006 | Kinkelaar et al. |
| 7,014,944 B2 | 3/2006 | Kordesch et al. |
| 7,067,216 B2 | 6/2006 | Yan et al. |
| 7,080,672 B2 | 7/2006 | Fournie et al. |
| 7,087,333 B2 | 8/2006 | Schäfer |
| 7,090,793 B2 | 8/2006 | Ma et al. |
| 7,205,064 B2 | 4/2007 | Markoski et al. |
| 7,291,410 B2 | 11/2007 | Kinkelaar et al. |
| 7,416,808 B2 | 8/2008 | Fujita et al. |
| 7,645,536 B2 | 1/2010 | Akiyama et al. |
| 7,651,797 B2 | 1/2010 | Markoski et al. |
| 7,651,804 B2 | 1/2010 | Kajitani et al. |
| 7,670,706 B2 | 3/2010 | Yamamoto et al. |
| 7,901,817 B2 | 3/2011 | Markoski et al. |
| 8,119,305 B2 | 2/2012 | Markoski et al. |
| 8,158,300 B2 | 4/2012 | Markoski et al. |
| 8,163,429 B2 | 4/2012 | Markoski et al. |
| 8,551,667 B2 | 10/2013 | Markoski et al. |
| 8,783,304 B2 | 7/2014 | Markoski et al. |
| 2001/0033960 A1 | 10/2001 | Cavalca et al. |
| 2001/0041283 A1 | 11/2001 | Hitomi |
| 2001/0053472 A1 | 12/2001 | Edlund |
| 2002/0015868 A1 | 2/2002 | Surampudi et al. |
| 2002/0031695 A1 | 3/2002 | Smotkin |
| 2002/0041991 A1 | 4/2002 | Chan et al. |
| 2002/0083640 A1 | 7/2002 | Finkelshtain et al. |
| 2002/0091225 A1 | 7/2002 | McGrath et al. |
| 2002/0127454 A1 | 9/2002 | Narang et al. |
| 2003/0003348 A1 | 1/2003 | Hanket |
| 2003/0091883 A1 | 5/2003 | Peled et al. |
| 2003/0096151 A1 | 5/2003 | Blunk et al. |
| 2003/0110841 A1 * | 6/2003 | Zhang et al. ................ 73/61.76 |
| 2003/0129464 A1 | 7/2003 | Becerra et al. |
| 2003/0148159 A1 | 8/2003 | Cox et al. |
| 2003/0170524 A1 | 9/2003 | Kordesch et al. |
| 2003/0175581 A1 | 9/2003 | Kordesch et al. |
| 2003/0194596 A1 * | 10/2003 | Ye et al. ................ 429/38 |
| 2003/0194598 A1 | 10/2003 | Chan |
| 2003/0198852 A1 | 10/2003 | Masel et al. |
| 2003/0219640 A1 | 11/2003 | Nam et al. |
| 2003/0231004 A1 | 12/2003 | Takahashi et al. |
| 2004/0018415 A1 | 1/2004 | Lai et al. |
| 2004/0039148 A1 | 2/2004 | Cao et al. |
| 2004/0045816 A1 | 3/2004 | Masel et al. |
| 2004/0058217 A1 | 3/2004 | Ohlsen et al. |
| 2004/0062965 A1 | 4/2004 | Morse et al. |
| 2004/0072047 A1 | 4/2004 | Markoski et al. |
| 2004/0084789 A1 | 5/2004 | Yan et al. |
| 2004/0096721 A1 | 5/2004 | Ohlsen et al. |
| 2004/0101740 A1 | 5/2004 | Sanders |
| 2004/0115518 A1 | 6/2004 | Masel et al. |
| 2004/0121208 A1 | 6/2004 | James et al. |
| 2004/0121209 A1 | 6/2004 | Yan et al. |
| 2004/0126666 A1 | 7/2004 | Cao et al. |
| 2004/0151965 A1 | 8/2004 | Forte et al. |
| 2004/0209153 A1 | 10/2004 | Peled et al. |
| 2004/0209154 A1 | 10/2004 | Ren et al. |
| 2004/0265681 A1 | 12/2004 | Markoski et al. |
| 2005/0001352 A1 | 1/2005 | Ma et al. |
| 2005/0003263 A1 | 1/2005 | Mallari et al. |
| 2005/0008923 A1 | 1/2005 | Malhotra |
| 2005/0026026 A1 | 2/2005 | Yen et al. |
| 2005/0053826 A1 | 3/2005 | Wang et al. |
| 2005/0058880 A1 | 3/2005 | Fujita et al. |
| 2005/0074657 A1 | 4/2005 | Rusta-Sallehy et al. |
| 2005/0084737 A1 | 4/2005 | Wine et al. |
| 2005/0084738 A1 | 4/2005 | Ohlsen et al. |
| 2005/0089748 A1 | 4/2005 | Ohlsen et al. |
| 2005/0123812 A1 | 6/2005 | Okamoto |
| 2005/0136309 A1 | 6/2005 | Masel et al. |
| 2005/0161342 A1 | 7/2005 | Carson et al. |
| 2005/0191541 A1 | 9/2005 | Gurau et al. |
| 2005/0202305 A1 | 9/2005 | Markoski et al. |
| 2005/0260465 A1 | 11/2005 | Harris |
| 2006/0003217 A1 | 1/2006 | Cohen et al. |
| 2006/0035136 A1 | 2/2006 | Markoski et al. |
| 2006/0040146 A1 | 2/2006 | Yamaguchi |
| 2006/0040147 A1 | 2/2006 | Yamaguchi |
| 2006/0059769 A1 | 3/2006 | Masel et al. |
| 2006/0078785 A1 | 4/2006 | Masel et al. |
| 2006/0088744 A1 | 4/2006 | Markoski et al. |
| 2006/0141328 A1 | 6/2006 | Johnston et al. |
| 2006/0147785 A1 | 7/2006 | Chiang et al. |
| 2006/0222923 A1 * | 10/2006 | Muramatsu et al. ............ 429/34 |
| 2006/0228622 A1 | 10/2006 | Cohen et al. |
| 2007/0020491 A1 | 1/2007 | Ogburn |
| 2007/0151983 A1 | 7/2007 | Patel et al. |
| 2007/0166595 A1 | 7/2007 | Akiyama et al. |
| 2007/0190393 A1 | 8/2007 | Markoski et al. |
| 2007/0277368 A1 * | 12/2007 | Adams et al. ................ 29/623.2 |
| 2007/0298312 A1 * | 12/2007 | Koehler et al. ................ 429/41 |
| 2008/0070083 A1 | 3/2008 | Markoski et al. |
| 2008/0248343 A1 | 10/2008 | Markoski et al. |
| 2008/0274393 A1 | 11/2008 | Markoski et al. |
| 2009/0035644 A1 | 2/2009 | Markoski et al. |
| 2009/0110999 A1 | 4/2009 | Yamamoto et al. |
| 2010/0196800 A1 | 8/2010 | Markoski et al. |
| 2011/0003226 A1 | 1/2011 | Markoski et al. |
| 2011/0008713 A1 | 1/2011 | Markoski et al. |
| 2012/0301799 A1 | 11/2012 | Markoski et al. |
| 2013/0017467 A1 | 1/2013 | Markoski et al. |
| 2014/0370419 A1 | 12/2014 | Markoski et al. |

FOREIGN PATENT DOCUMENTS

| | | |
|---|---|---|
| EP | 0 664 930 B1 | 5/1996 |
| EP | 1 818 654 A1 | 8/2007 |
| EP | 1 819 004 A1 | 8/2007 |
| EP | 10152856.0-1360 | 3/2015 |
| GB | 1018825 | 2/1966 |
| GB | 1 416 483 | 12/1975 |
| JP | 63 313472 A | 12/1988 |
| KR | 10-2008-0045416 | 5/2008 |
| WO | WO 94/09524 | 4/1994 |
| WO | WO 96/12317 | 4/1996 |
| WO | WO 98/06145 | 2/1998 |
| WO | WO 01/39307 A2 | 5/2001 |
| WO | WO 01/54216 A2 | 7/2001 |
| WO | WO 01/94450 A2 | 12/2001 |
| WO | WO 02/11226 A2 | 2/2002 |
| WO | WO 03/002247 A1 | 1/2003 |
| WO | WO 03/009410 A2 | 1/2003 |
| WO | WO 2004/027891 A2 | 4/2004 |
| WO | WO 2004/027901 A2 | 4/2004 |

(56) References Cited

FOREIGN PATENT DOCUMENTS

| WO | WO 2005/082024 | 9/2005 |
|---|---|---|
| WO | WO2005/082024 A2 | 9/2005 |
| WO | WO 2005/088759 A2 | 9/2005 |
| WO | WO 2007013880 | 2/2007 |
| WO | WO 2007/095492 | 8/2007 |
| WO | WO 2008/122042 | 10/2008 |

OTHER PUBLICATIONS

Granados-Focil et al., "Polyphenylene Sulfonic Acid: a new PEM", http://www1.eere.energy.gov/hydrogenandfuelcells/pdfs/hi_tem_pems_talk.pdf, 26 pages, 2003.

Jiang et al., "$CO_2$ Crossover Through a Nafion Membrane in a Direct Methanol Fuel Cell", Electrochemical and Solid-State Letters, 5 (7), pp. A156-A159, 2002.

Service, "New Polymer May Rev Up the Output of Fuel Cells Used to Power Cars", Science, vol. 312, p. 35, 2006.

Thomas et al., "Fuel Cells—Green Power", Los Alamos National Laboratory, http://www.scied.science.doe.gov/nmsb/hydrogen/Guide%20to%20Fuel%20Cells.pdf, 36 pages, 1999.

Hejze et al., "Preparation of Pd-coated polymer electrolyte membranes and their application in direct methanol fuel cells", Journal of Power Sources, 140, pp. 21-27, 2005.

Kordesch et al., "Direct methanol-air fuel cells with membranes plus circulating electrolyte", Journal of Power Sources, 96, pp. 200-203, 2001.

Li et al., "An improved palladium-based DMFCs cathode catalyst", Chem. Commun., pp. 2776-2777, 2004.

Peled et al., "0.5 W/$cm^2$ Direct Methanol-Air Fuel Cell", Electrochemical and Solid-State Letters, 7 (12), pp. A507-A510, 2004.

Baker, "Membrane Technology," Encyclopedia of Polymer Science and Technology, vol. 3, pp. 184-249, 2001.

Kim et al., "Non-Nafion Membrane Electrode Assemblies", Los Alamos National Laboratory, http://www.hydrogen.energy.gov/pdfs/review06/fc_3_kim.pdf, pp. 1-24, 2005.

Shim et al., Nafion-impregnated polyethylene-terephthalate film used as the electrolyte for direct methanol fuel cells, Electrochimica Acta, 50, pp. 2385-2391, 2005.

"Celtec® V-Membrane for DMFC Applications", PEMAS Fuel Cell Technologies, 6 pages, printed Jul. 19, 2005.

Rozière et al., "Non-Fluorinated Polymer Materials for Proton Exchange Membrane Fuel Cells", Annu. Rev. Mater. Res., 33, pp. 503-555, 2003.

Shim et al., "Electrochemical Acceleration of Hydrogen Transfer Through a Methanol Impermeable Metallic Barrier", Journal of the Electrochemical Society, 150 (12), pp. A1583-A1588, 2003.

Tang et al., "Modification of Nafion™ membrane to reduce methanol crossover via self-assembled Pd nanoparticles", Materials Letters, 59, pp. 3766-3770, 2005.

Peled et al., "A Direct Methanol Fuel Cell Based on a Novel Low-Cost Nanoporous Proton-Conducting Membrane", Electrochemical and Solid-State Letters, 3 (12), pp. 525-528, 2000.

Peled et al., "Novel approach to Recycling Water and Reducing Water Loss in DMFCs", Electrochemical and Solid-State Letters, 6 (12), pp. A268-A271, 2003.

Blum et al., "Water-neutral micro direct-methanol fuel cell (DMFC) for portable applications", Journal of Power Sources, 117, pp. 22-25, 2003.

Zhu et al., "The behavior of palladium catalysts in direct formic acid fuel cells", Journal of Power Sources, 139, pp. 15-20, 2005.

Sigracet, GDL 24 & 25 Series Gas Diffusion Layer, product information, SGL Carbon Group, 2 pages, 2004.

Choi et al., "Modification of proton conducting membrane for reducing methanol crossover in a direct-methanol fuel cell", Journal of Power Sources, 96, pp. 411-414, 2001.

Pu et al., "A Methanol Impermeable Proton Conducting Composite Electrolyte System", Journal of the Electrochemical Society, 142, pp. L119-L120, 1995.

Kim et al., "Evaluation of a palladinized Nafion™ for direct methanol fuel cell application", Electrochimica Acta, 49, pp. 3227-3234, 2004.

Halliday. et al., "Fundamentals of Physics", Extended Third Edition, pp. 662-685, 1988.

Osmonics the Filtration Spectrum, Osmonics, Inc., Minnetonka, Minnesota, 1 page, (1984).

Xia, S.J. et al., Proceedings of the $207^{th}$ Meeting of the Electrochemical Society, Abstract #779, Quebec City, Canada, May 21-25, (2005).

Choban, E.R. et al., "Microfluidic Fuel Cells That Lack a PEM", Power Sources Proceedings, vol. 40, pp. 317-320, (2002).

Choban, E.R. et al., "Membraneless Fuel Cell Based on Laminar Flow," ASME Fuel Cell Science, Engineering and Technology Proceedings, pp. 261-265, (2003).

Ferrigno, R. et al., "Membraneless Vanadium Redox Fuel Cell Using Laminar Flow", J. Am. Chem. Soc., vol. 124, pp. 12930-12931, (2002).

Choban, E.R. et al., "Characterization of Limiting Factors in Laminar Flow-Based Membraneless Microfuel Cells", Electrochemical and Solid-State Letters, 8 (7), pp. A348-A352, (2005).

Choban, E.R. et al., "Microfluidic Fuel Cell Based on Laminar Flow", J. Power Sources, 128, pp. 54-60, (2004).

www.whatman.com "Leadership in separations technology for the life Sciences", 1 page, (2009).

Jankowski, A.F. et al., "Micro-Fabricated Thin-film Fuel Cells for Portable Power Requirements", Spring Meeting of the Materials Research Society, San Francisco, CA, Apr. 1-5, 2002, 7 pages, (2002).

Chan, K-Y et al., "Meniscus behavior and oxygen reduction in tapered pore gas diffusion electrodes", Electrochimica Acta, vol. 33, No. 12, pp. 1767-1773, (1988).

Chan, K-Y et al., "A wedge-meniscus model of Gas-Diffusion Electrodes", Electrochimica Acta, 32, 8, pp. 1227-1232, (1987).

Waszczuk, P. et al., "Methanol Electrooxidation on Platinum/Ruthenium Nanoparticle Catalysts", Journal of Catalysis, 203, pp. 1-6, (2001).

Peng, F.Z. et al., "A new ZVS bidirectional dc-dc converter for fuel cell and battery application," IEEE Transactions on Power Electronics, 19, 1, pp. 54-65, (2004).

Krein, P.T. et al., "Low cost inverter suitable for medium-power fuel cells," IEEE Power Electronics Specialists Conference, vol. 1, pp. 321-326, (2002).

Cygan, P.J. et al., "Hybrid Power Sources for Military Applications," The Eighteenth Annual Battery Conference on Applications and Advances, pp. 85-90, (1).

Jarvis, L.P. et al., "Hybrid Power Source for Manportable Applications," IEEE Aerospace and Electronic Systems Magazine, 18, 1, pp. 13-16, (2003).

Atwater, T.B. et al., "Man portable power needs of the $21^{st}$ century," Journal of Power Sources, vol. 91, No. 1, pp. 27-36, (2000).

Jarvis, L.P. et al., "Fuel cell/Lithium-ion battery hybrid for manportable applications," The Seventeenth Annual Battery Conference on Applications and Advances, pp. 69-72, (2002).

Gao, L. et al. "An actively controlled fuel cell/battery to meet pulsed power demands," Journal of Power Sources, 130, pp. 202-207, (2004).

Zheng, J.P. et al., "Hybrid power sources for pulsed current applications," IEEE Transactions on Aerospace and Electronic Systems, vol. 37, pp. 288-292, (2001).

Jiang, Z. et al., "Design and experimental tests of control strategies for active hybrid fuel cell/battery power sources," Journal of Power Sources, 130, pp. 163-171 (2004).

Acharya, P. et al., "An advanced fuel cell simulator," IEEE Applied Power Electronics Conference, pp. 1554-1558, (2004).

Weigl, B.H. et al., "Microfluidic diffusion-based separation and detection", Science, 283, pp. 346-347, (1999).

Kenis, P.J.A. et al., "Microfabrication Inside Capillaries Using Multiphase Laminar Flow Patterning", Science, vol. 285, pp. 83-85, (1999).

Wesseler, E.P. et al., "The Solubility of Oxygen in Highly Fluorinated Liquids", Journal of Fluorine Chemistry, 9, pp. 137-146, (1977).

(56) References Cited

OTHER PUBLICATIONS

Riess, J.G. et al., "Solubility and Transport Phenomena in Perfluorochemicals Relevant to Blood Substitution and Other Biomedical Applications", Pure & Appl. Chem., vol. 54, No. 12, pp. 2383-2406, (1982).

International Search Report dated Oct. 25, 2006 for PCT application No. PCT/US05/05962.

Rice, C. et al., "Direct Formic Acid Fuel Cells", Journal of Power Sources, vol. 111, pp. 83-89, (2002).

Lu, G-Q et al., "Formic Acid Decomposition on Polycrystalline Platinum and Palladized Platinum Electrodes", J. Phys. Chem., vol. 103, pp. 9700-9711, (1999).

Waszczuk, P. et al., "A nanoparticle catalyst with superior activity for electrooxidation of formic acid", Electrochemistry Communications, vol. 4, pp. 599-603, (2002).

International Search Report dated Mar. 30, 2007 for PCT application No. PCT/US05/32990.

Park, S. et al., "Electrochemical Infrared Characterization of CO Domains on Ruthenium-Decorated Platinum Nanoparticles" J. Am. Chem. Soc. 125, pp. 2282-2290, (2003).

Babu, P.K. et al., "Electronic Alterations Caused by Ruthenium in Pt—Ru Alloy Nanoparticles as Revealed by Electrochemical NMR", J. Phys. Chem., 107, pp. 7595-7600, (2003).

Hentges, P.J. et al., "Planar tunneling spectroscopic studies of splitting vs. non-splitting of the zero-bias conductance peak in $YBa_2Cu_3O_{7-}$ thin films", Physica C, 408-410, pp. 801-803, (2004).

Hentges, P.J. et al., "Solution-growth of ultra-thin, insulating layers of zirconia for passivation and tunnel junction fabrication on YBCO thin films", IEEE Transactions on Applied Superconductivity, v. 13, No. 2, pp. 801-804, (2003).

Greene, L.H. et al., "Planar tunneling spectroscopy of high-temperature superconductors: Andreev bound states and broken symmetries", Physica C, 387, pp. 162-168, (2003).

Greene, L.H. et al., "Detection and Control of Broken Symmetries with Andreev Bound State Tunneling Spectroscopy: Effects of Atomic-Scale Disorder", Physica C, 408-410, pp. 804-806, (2004).

Kimball, J.W. et al., "Issues with low-input-voltage boost converter design," IEEE Power Electronics Specialists Conference, Aachen, Germany, pp. 2152-2156, (2004).

Ismagilov, R.F. et al., "Experimental and theoretical scaling laws for transverse diffusive broadening in two-phase laminar flows in microchannels," Applied Physics Letters, vol. 76, No. 17, pp. 2376-2378, (2000).

Kenis, P.J.A. et al., "Microfabrication Inside Capillaries Using Multiphase Laminar Flow Patterning," Science, vol. 285, pp. 83-85, (1999).

Ismagilov, R.F. et al., "Pressure-driven laminar flow in tangential microchannels: an elastomeric microfluidic switch", Anal. Chem., 73, pp. 4682-4687, (2001).

Dobbs, B.G. et al., "A multiple-input dc-dc converter topology", IEEE Power Electronic Letters, vol. 1, No. 1, pp. 6-9, (2003).

Musunuri, S. et al., "Fabrication and Characterization of PDMA Inductors", IEEE Power Electronics Specialists Conference, Aachen, Germany, pp. 4460-4466, (2004).

Coutanceau, C. et al., "Radioactive Labeling Study and FTIR Measurements of Methanol Adsorption and Oxidation on Fuel Cell Catalysts", Fuel Cells, 2, pp. 153-158, (2002).

Jankowski A.F., et al., "Sputter Deposition of Metallic Sponges", 48th International Symposium on the American Vacuum Society, San Francisco, CA, Oct. 26-Nov. 2, 2001, 14 pages (2001).

Guo, J-W., et al., "Effect of Current collector corrosion made from Printed Circuit Board (PCB) on the degradation of self-breathing direct methanol fuel cell stack", Electrochimica Acta, 53, pp. 3056-3064, (2008).

Morse, J. et al., "An Integrated Microfluidic Fuel Cell System for Energy Conversion from Hydrocarbon Fuels", Electrochemical Society Spring Symposium, Philadelphia, PA, May 12-17, 2002, 1 page, (2002).

Park H.G. et al., "Transport in a Microfluidic Catalytic Reactor", Proceedings of HT2003, ASME Summer Heat Transfer Conference, Jul. 21-23, 2003, Las Vegas, Nevada, pp. 1-10, (2003).

Zhang, J. et al., "Electrochemical Measurement of $O_2$ Permeation Rate through Polymer Electrolyte Membranes", 216th ECS Meeting, Abstract #830, The Electrochemical Society, 1 page, (2009).

Chu, D. et al., Alkaline Membrane Electrolyte Fuel Cell Research and Development at the U.S. Army Research Laboratory, 216th ECS Meeting, Abstract #385, The Electrochemical Society, 1 page, (2009).

Jiang, R. et al., "Water and Fuel Crossover in a Direct Methanol Fuel Cell Stack", 212th ECS Meeting, Abstract #601, The Electrochemical Society, 1 page, (2007).

Jiang, R. et al., "A Palladium Deposited Nafion Membrane via Supercritical Carbon Dioxide (sc-$CO_2$) Medium for DMFCs", 207th ECS Meeting, Abstract #784, The Electrochemical Society,1 page, (2005).

Jiang, R. et al., "Sol-Gel Derived Nafion/Silica Hybrid Electrolyte Membranes for Direct Methanol Fuel Cells (DMFCs)", 207th ECS Meeting, Abstract #56, The Electrochemical Society, 1 page, (2005).

Jiang, R. et al., "Direct Methanol Fuel Cell System Performance: From Materials, Components, to System and Fuel Efficiency", 209th ECS Meeting, Abstract #1143, The Electrochemical Society, 1 page, (2006).

Jiang, R. et al., "Durability Evaluation of Direct Methanol Fuel Cells", 208th ECS Meeting, Abstract #1216, The Electrochemical Society, 1 page, (2005).

Jiang, R. et al., "Comparison of Several Research Approaches for Direct Methanol Fuel Cell Membranes", 208th ECS Meeting, Abstract #965, The Electrochemical Society, 1 page, (2005).

Jankowski, A.F. et al., Micro-Fabricated Thin-Film Fuel Cells for Portable Power Requirements, Mat. Res. Soc. Symp.Proc., vol. 730, pp. V4.2.1-V4.2.6, (2002).

Chen, C.Y. et al., "Portable DMFC system with methanol sensor-less control", Journal of Power Sources, 167, pp. 442-449, (2007).

Livshits, V. et al., "Direct ethylene glycol fuel-cell stack—Study of oxidation intermediate products", Journal of Power Sources, 178, pp. 687-691, (2008).

Cooper, K.R. et al., "Electrical Test Methods for On-Line Fuel Cell Ohmic Resistance Measurement", Journal of Power Sources, vol. 160, pp. 1088-1095, (2006).

Niemann, J., "Unraveling Fuel Cell Electrical Measurements", Fuel Cell Magazine, April/May, pp. 26-31, (2005).

Smith, M. et al., "Comparison of Fuel Cell Electrolyte Resistance Measurement Techniques", Fuel Cell Magazine, April/May, pp. 32-37, (2005).

Hollinger et al., "Nanoporous separator and low fuel concentration to minimize crossover in direct methanol laminar flow fuel cells," Journal of Power of Sources, pp. 3523-3528, (2010).

International Search Report dated Sep. 12, 2007 for PCT Appl. No. PCT/US2007/061980.

Choban et al., "Membraneless laminar flow-based micro fuel cells operating in alkaline, acidic, and acidic/alkaline media," Electrochimica Acta, vol. 50, No. 27, pp. 5390-5398, (2005).

Primak et al., "Improved Performance of Direct Methanol Laminar Flow Fuel Cells," Proceedings 207th ECS Meeting, Abstract #137, Quebec City, Canada, May 15-20, (2005).

International Search Report dated Jun. 24, 2008 for PCT Appl. No. PCT/US2008/059146.

Heinzel et al, "A Review of the State-of-the-Art of the Methanol Crossover in Direct Methanol Fuel Cells," J. Power Sources, 1999, pp. 70-74, vol. 84.

Branebjerg et al, "Application of Miniature Analyzers from Microfluidic Components to uTAS," Proceedings of Micro Total Analysis Systems Conference, Netherlands, 1994, pp. 141-151.

Brody et al, "Diffusion-Based Extraction in a Microfabricated Device," Sensors and Actuators, 1997, pp. 13-18, vol. A58.

Zhao et al, "Surface-Directed Liquid Flow Inside Microchannels," Science, 2001, pp. 1023-1026, vol. 291.

\* cited by examiner

METHOD AND APPARATUS FOR ENHANCING POWER DENSITY OF DIRECT LIQUID FUEL CELLS

REFERENCE TO RELATED APPLICATIONS

This application claims the benefit of U.S. Provisional Application No. 61/430,035 entitled "METHOD AND APPARATUS FOR ENHANCING POWER DENSITY OF DIRECT LIQUID FUEL CELLS" filed Jan. 5, 2011, which is incorporated by reference in its entirety.

BACKGROUND

Fuel cell technology shows great promise as an alternative energy source for numerous applications. Fuel cells have been investigated for use in mobile applications, such as portable computers, mobile communications, and GPS tracking devices. Several types of fuel cells have been developed, including polymer electrolyte membrane fuel cells, direct methanol fuel cells, alkaline fuel cells, phosphoric acid fuel cells, molten carbonate fuel cells, and solid oxide fuel cells. For a comparison of several fuel cell technologies, see Los Alamos National Laboratory monograph LA-UR-99-3231 entitled Fuel Cells: Green Power by Sharon Thomas and Marcia Zalbowitz.

Important challenges faced in the development of fuel cell technology include enabling quick start-up of fuel cells in cool environments (less than 10° C.) and ensuring the stable and continuous operation of fuel cells in low-humidity environments. In cool environments, the electrochemical cell stack of a fuel cell may take up to 10 minutes to reach its operational temperature. In typical consumer applications, this warm-up period is an inconvenience. However, in more aggressive applications, such as use in military environments, such a delay may affect the operation of vital communications, navigation, or global positioning equipment, presenting an unacceptable risk to the safety of military personnel and thus deterring the implementation of fuel cells in these applications.

Traditional direct liquid fuel cells vent a large portion of the heat and water they produce into the surrounding environment. Consequently, use in cool environments may be less than optimal. By venting heat from the fuel cell system, the overall temperature of the fuel cell stack is decreased, reducing its reaction kinetics and, as a result, reducing the amount of power generated by the fuel cell. In order to overcome issues encountered in cool environments, such as less than optimal power generation resulting from a reduced operating temperature, previous systems have increased the amount of platinum catalyst used in the stack and/or increased the number of cells in the stack. However, such measures may substantially increase the cost and weight of the fuel cell stack.

In dry environments, continuous operation of a traditional direct liquid fuel cell may lead to internal dehydration issues, since the exhaust stream may contain large amounts of water which cannot be fully recovered by the fuel cell's condenser before the exhaust stream is vented into the surrounding environment. If the amount of water which is vented from the system is greater than or equal to the rate at which it is produced internally, the fuel cell may experience reduced performance or failure due to dehydration. To overcome water loss issues which may arise when fuel cells are operated in high-temperature/low-humidity environments, such as in the desert, previous direct liquid fuel cell systems have been designed to operate on a water-diluted fuel (approximately 30% water by volume), rather than on 100% fuel. However, the use of diluted fuels increases the overall weight and decreases the portability of the fuel cell system, since, as compared to 100% fuel, a larger volume of diluted fuel is required to achieve the same performance and operational run-time.

Another challenge in direct liquid fuel cell technology is developing fuel cells for use in enclosed spaces or in spaces with poor ventilation. Because a fuel cell may experience fuel cross-over and incomplete fuel utilization, fuel vapor and incomplete oxidation emissions may be vented into the area surrounding the fuel cell, threatening the health and safety of persons nearby.

SUMMARY

In a first aspect, the present invention is a fuel cell comprising a direct liquid fuel cell and a humidifier. The direct liquid fuel cell comprises an air intake channel for providing oxidant to the fuel cell and an exhaust channel for exhausting depleted oxidant. The humidifier forms a fluid connection between the air intake channel and the exhaust channel.

In a second aspect, the present invention is a method of generating electricity from a direct liquid fuel cell comprising flowing a reactant stream into a direct liquid fuel cell, reacting the reactant stream to produce an exhaust stream, and transferring water from the exhaust stream to the reactant stream with a humidifier.

In a third aspect, the present invention is a method of generating electricity from a direct liquid fuel cell comprising flowing a reactant stream into a direct liquid fuel cell, reacting the reactant stream to produce an exhaust stream, and transferring fuel vapor from the exhaust stream to the reactant stream with a humidifier.

In a fourth aspect, the present invention is a power producing device comprising a direct methanol fuel cell having an air intake channel for providing oxidant to the direct methanol fuel cell. The direct methanol fuel cell produces a current density of at least 50 $mA/cm^2$ at an air stoichiometry of at most 3.0.

In a fifth aspect, the present invention is a method of generating electricity from a direct methanol fuel cell comprising flowing methanol and oxidant into a direct methanol fuel cell and reacting the methanol and oxidant to generate electricity. The direct methanol fuel cell operates at an air stoichiometry of at most 3.0. The direct methanol fuel cell produces a current density of at least 50 $mA/cm^2$.

The term "direct liquid fuel cell" means a fuel cell which is capable of generating electrical power directly from a water soluble fuel which has not been processed or reformed into hydrogen. For example, a direct methanol fuel cell is capable of generating electrical power from unreformed methanol fuel.

The term "fuel cell stack" means a plurality of fuel cells that have a common inlet and outlet.

The term "parallel flow field" means a plurality of channels in parallel fluid connection with each other.

The term "exhaust channel" means a fluid channel through which depleted oxidant, depleted fuel, and/or product gases are expelled from an electrochemical cell. An exhaust channel may expel components in a gaseous and/or liquid form. For example, the exhaust channel of a fuel cell may expel depleted gaseous oxidant and product gases, or the exhaust channel of a fuel cell may expel depleted gaseous oxidant, depleted liquid fuel, and product gases.

The term "effluent" means a fluid which flows out of an object or device. An effluent may be in a gas or liquid phase.

The term "stoichiometric amount" means the amount of a reagent for which, assuming a reaction proceeds to completion, there is no excess or shortage of the reagent. For example, in reacting hydrogen with one (1) mole of oxygen to produce water, the stoichiometric amount of hydrogen is two (2) moles, since, if the reaction proceeds to completion, this amount of hydrogen results in no excess or shortage of hydrogen. The stoichiometric amount of a substance may be expressed as a mass, a number of moles, or as a ratio of the amount of the substance relative to the amount of another substance.

The term "air stoichiometry" means a ratio of (i) the amount of oxidant supplied to an electrochemical cell to (ii) the stoichiometric amount of the oxidant necessary to oxidize the fuel delivered by the fuel pump. For example, if the stoichiometric amount of oxygen—the amount of oxygen required for a reaction to proceed to completion without an excess or shortage of oxygen—is two (2) moles, and five (5) moles of oxygen are supplied to the electrochemical cell, the air stoichiometry is 2.5.

DETAILED DESCRIPTION

The present invention makes use of the discovery of a direct liquid fuel cell system which incorporates one or more cross-flow humidifiers to increase the humidity and/or temperature of its oxidant intake stream, thereby increasing the performance and power density of the direct liquid fuel cell stack. By extracting heat and/or water from the fuel cell's exhaust stream, the temperature of the fuel cell stack may be increased by 10-15° C., ensuring more complete fuel utilization by increasing the reaction kinetics of the fuel oxidation and oxygen reduction reactions. Furthermore, the operational temperature and humidity range of the fuel cell may be expanded, reducing the likelihood of cell dehydration in low-humidity environments. Moreover, because fuel utilization may be increased and incomplete oxidation emissions decreased and fuel vapor entrained in the exhaust stream may be extracted by the humidifier and oxidized at the cathode, fewer hazardous substances may be released into the surrounding environment, enabling the fuel cell to be used in enclosed or poorly ventilated areas.

Incorporating one or more humidifiers into a fuel cell may increase power generation efficiency and decrease the cost, size, and weight of the direct liquid fuel cell stack and fuel cell components. By transferring heat, for example, via water and water vapor, from the exhaust stream to the oxidant intake stream, the fuel cell may warm up more quickly—approximately three times faster—for example, decreasing a 10-minute startup time to ~3 minutes. Additionally, by increasing the performance and power density of the fuel cell stack, less platinum catalyst may be required, reducing the single greatest expense of the fuel cell stack. Furthermore, fewer cells may be required to achieve the same performance, reducing the cost, size, and weight of the fuel cell. Because liquid water and water vapor may be passively recovered from the exhaust stream, and not merely exhausted into the surrounding environment, the fuel cell may operate on pure fuel and does not require water-diluted fuel. Water-diluted fuel may be approximately 30% water by volume. Such fuel is substantially heavier and occupies a larger volume than an energy-equivalent amount of pure fuel. Consequently, by enabling a fuel cell to operate on pure fuel, the portability of the fuel cell may be increased.

Figure 1:
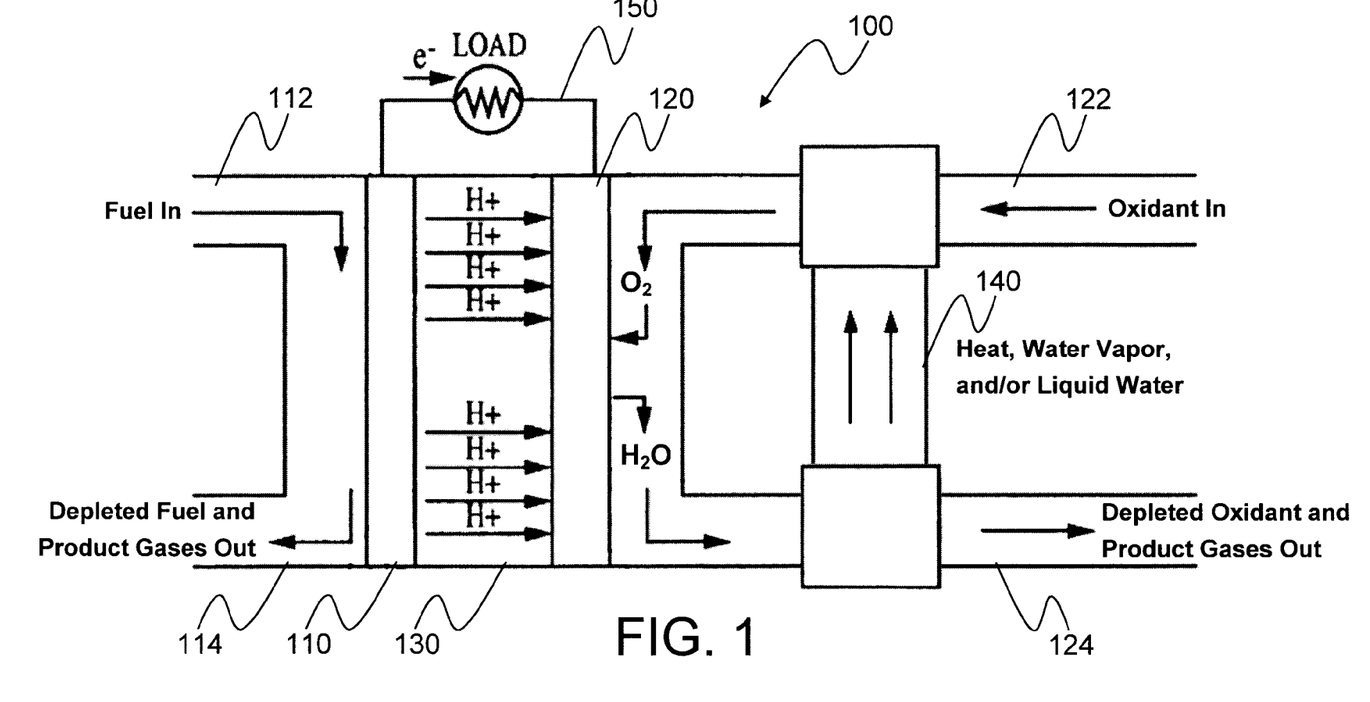
FIG. 1 illustrates a direct liquid fuel cell with a humidifier.

FIG. 1 illustrates a fuel cell with a humidifier having aspects of the present invention. The fuel cell 100 includes an anode 110, a fuel inlet 112, a fuel outlet 114, a cathode 120, an air intake channel 122, an air exhaust channel 124, an electrolyte 130, a humidifier 140, and an external circuit 150. The electrolyte 130 may be alkaline or acidic, a liquid electrolyte, a solid electrolyte, such as a polymer electrolyte membrane (PEM), or a liquid electrolyte contained within a host material, such as the electrolyte in a phosphoric acid fuel cell (PAFC).

The fuel inlet 112 is in fluid connection with the fuel outlet 114. The fuel inlet 112 and the fuel outlet 114 are in contact with the anode 110. The electrolyte 130 is between the anode 110 and the cathode 120. In operation, the anode 110 is electrically connected to the cathode 120 by the external circuit 150. The air intake channel 122 is in fluid connection with the air exhaust channel 124. The air intake channel 122 and the air exhaust channel 124 are in contact with the cathode 120. The humidifier 140 is in fluid communication with the air intake channel 122 and the air exhaust channel 124.

In acidic operation, fuel in the liquid phase flows through the fuel inlet 112 and over the anode 110, where it is oxidized to produce protons, electrons, and product gases and/or liquids. Depleted fuel and/or product gases flow through the fuel outlet 114 and away from the anode 110. Electrons produced at the anode 110 flow through the external circuit 150 to the cathode 120, while protons produced at the anode 110 travel through the electrolyte 130 to the cathode 120. As fuel flows in through the fuel inlet 112, oxidant flows in through the air intake channel 122 and over the cathode 120. The oxidant is reduced in the presence of protons and electrons at the cathode 120, producing water in the liquid and/or vapor state. Depleted oxidant and product gases/liquids, such as water vapor and liquid water, flow away from the cathode 120 through the air exhaust channel 124 and into the humidifier 140.

As product gases and/or liquids in the air exhaust channel 124 pass through the humidifier 140, the humidifier 140 extracts heat, water vapor, and/or liquid water from the exhaust stream. The extracted heat, water vapor, and/or liquid water are transferred through the humidifier 140 to the air intake channel 122, heating and humidifying the air intake channel 122. Consequently, the humidifier 140 may reduce the amount of heat which is expelled into the surrounding environment during the start-up phase, enabling the fuel cell 100 to reach its steady state operating temperature more quickly. In addition, because a portion of the heat which would otherwise be expelled into the surrounding environment is transferred back into the fuel cell 100, the average operating temperature of the fuel cell 100 may be increased. By increasing the average operating temperature of the fuel cell 100, reaction kinetics may be improved, leading to increased cell efficiency and performance, ensuring more complete fuel utilization, and reducing incomplete oxidation emissions. Moreover, by recovering a portion of the water vapor and/or liquid water which may otherwise be exhausted into the environment, the humidifier 140 may enable the fuel cell 100 to operate in low-humidity and high temperature environments without the need for water-diluted fuels.

The humidifier 140 may be configured to extract fuel vapor from the air exhaust channel 124 and transfer the fuel vapor to the air intake channel 122, enabling the fuel vapor to be oxidized at the cathode 120. For example, fuel may cross-over from the anode 110, through the electrolyte 130, to the cathode 120. By burning fuel vapor at the cathode 120, the amount of fuel vapor released into the surrounding environment may be decreased.

Preferably, the humidifier 140 is a light-weight, polyethylene cross-flow humidifier with NAFION® capillary tube design. More preferably, the humidifier 140 is a FCT™ 125-240-5E Fuel Cell Humidifier manufactured by PERMA PURE™ LLC (Toms River, N.J.). In order to decrease pressure drops between the fuel cell's 100 air exhaust channel 124 and air intake channel 122, the humidifier 140 preferably has a parallel flow field design. The parallel flow field design may include a plurality of flow channels in parallel fluid connection with the air exhaust channel 124 and air intake channel 122.

Figure 2:
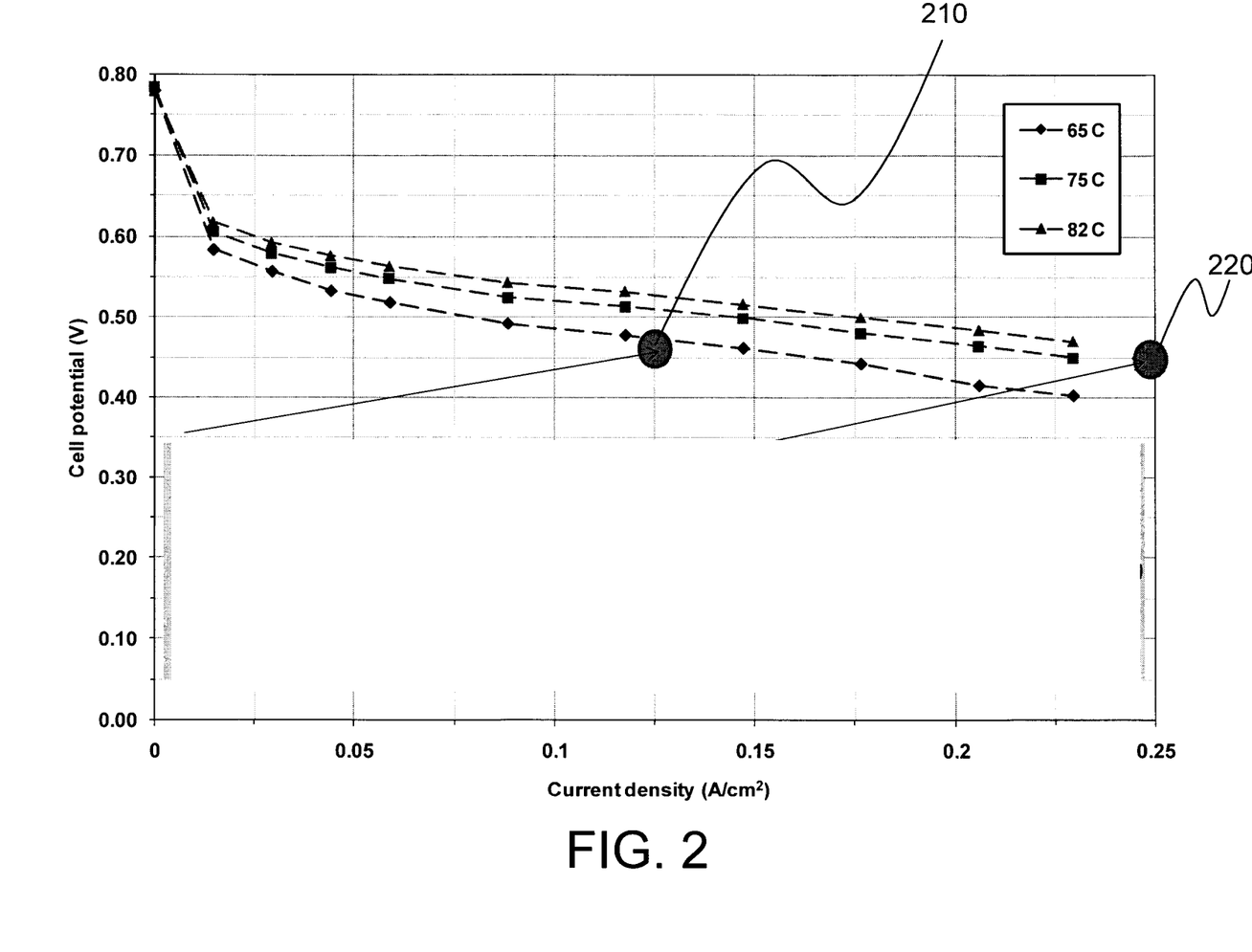
FIG. 2 illustrates a graph of the kinetic enhancement of a direct methanol liquid feed fuel cell (LFFC) as a function of increased cell temperature.

FIG. 2 illustrates a graph of the kinetic enhancement of a direct methanol liquid feed fuel cell as a function of increased cell temperature. The experiment used a single cell operating in a dilute fuel regime (0.25M). The graph shows the operating characteristics of the cell at 65° C., 75° C., and 82° C. The increased cell temperature allowed for an increased current density (rate) at the same cell potential. For example, increasing the cell temperature from 65° C. to 82° C. enabled a doubling of the current density—from ~0.125 A/cm² (210) to ~0.25 A/cm² (220)—at the same cell potential (~0.45 V). This activation shift is due to the enhancement of reaction kinetics at both the anode and the cathode. In one aspect, the stack temperature of a direct liquid fuel cell stack may be increased by i) using a parasitic heater, or ii) by passively increasing the temperature and humidity of the oxidant intake, decreasing the air stoichiometry, or a combination of both.

By shifting from the operating point of a direct liquid fuel cell stack 210 to the high efficiency operating point 220, the cost of the stack may be dramatically reduced while maintaining the performance and durability of the stack. For example, shifting from operating point 210 to operating point 220 enables a 50% reduction in the amount of active area to produce the requisite power and thus 50% less Pt catalyst at the same fuel cell stack efficiency.

Figure 3:
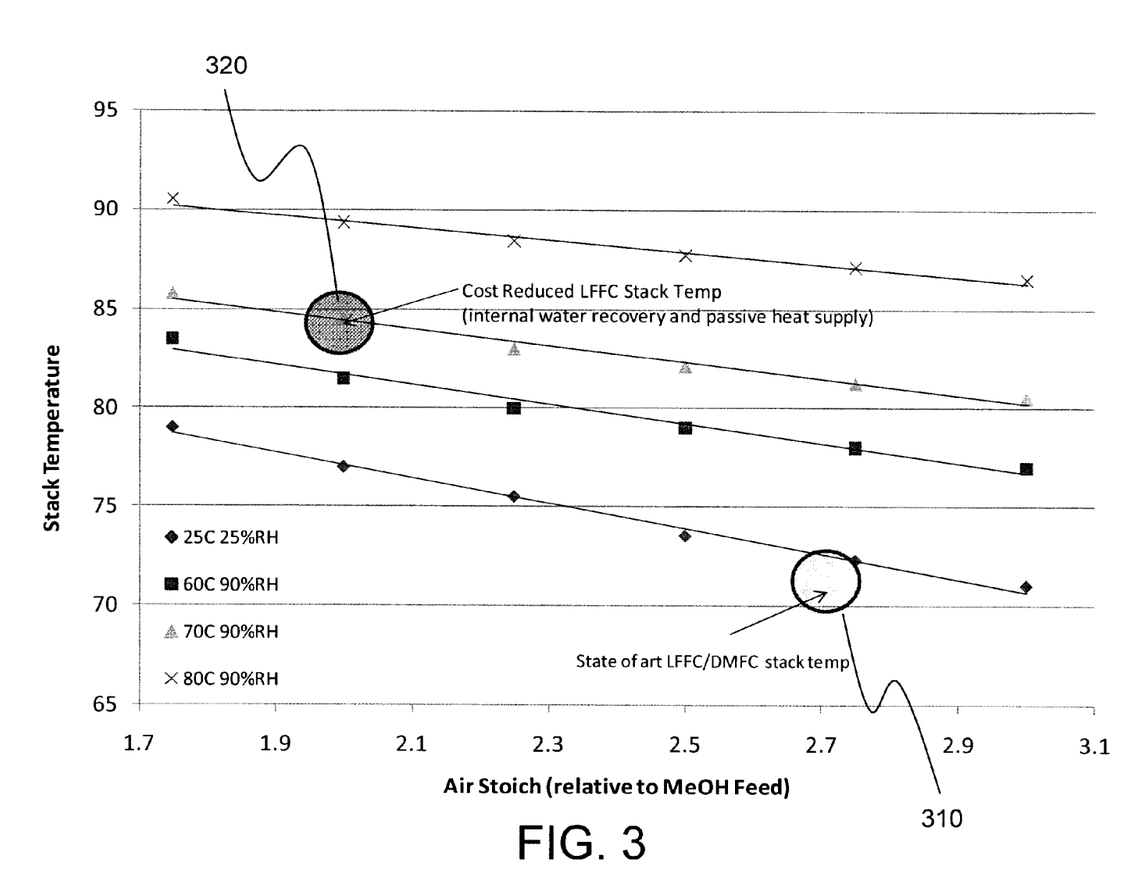
FIG. 3 is a graph of the theoretical fuel cell stack temperature as a function of air stoichiometry.

FIG. 3 is a graph of the theoretical direct liquid fuel cell stack temperature as a function of air stoichiometry, relative to the methanol fuel feed. The theoretical stack temperature was calculated at a series of air stoichiometries for four air inlet temperatures and humidity levels. The results were derived from a theoretical first principles model and were experimentally verified. The results indicated that reducing the air stoichiometry and increasing the temperature and humidity of the incoming air stream may raise the stack temperature, which may increase reaction kinetics and overall cell performance. In previous fuel cells, the fuel cell stack could not be operated at an air stoichiometry below 2.0 due to oxygen starvation and mass transport issues. However, by using a humidifier to recover heat, water vapor, and/or liquid water from the fuel cell's exhaust stream, air stoichiometries below 2.0 become possible.

The temperature of the fuel cell stack may be increased by reducing air stoichiometry and increasing the temperature and humidity of the air intake stream. For a fuel cell operating with an air inlet temperature of 25° C. and a relative humidity of 25%, and at an air stoichiometry of 3.0, the theoretical stack temperature was determined to be approximately 71° C., while at an air stoichiometry of approximately 1.8, the theoretical stack temperature was determined to be approximately 79° C. For a fuel cell operating with an air inlet temperature of 60° C. and a relative humidity of 90%, and at an air stoichiometry of 3.0, the theoretical stack temperature was determined to be approximately 77° C., while at an air stoichiometry of approximately 1.8, the theoretical stack temperature was determined to be approximately 84° C. For a fuel cell operating with an air inlet temperature of 70° C. and a relative humidity of 90%, and at an air stoichiometry of 3.0, the theoretical stack temperature was determined to be approximately 81° C., while at an air stoichiometry of approximately 1.8, the theoretical stack temperature was determined to be approximately 86° C. For a fuel cell operating with an air inlet temperature of 80° C. and a relative humidity of 90%, and at an air stoichiometry of 3.0, the theoretical stack temperature was determined to be approximately 87° C., while at an air stoichiometry of approximately 1.8, the theoretical stack temperature was determined to be approximately 91° C. Consequently, the model shows that the stack temperature may be raised by reducing the air stoichiometry and increasing the temperature and humidity of the incoming air stream.

The operating point of a traditional, high concentration (1-5 M) direct-methanol fuel cell (DMFC) 310 corresponds to an air stoichiometry of approximately 2.7, resulting in a stack temperature of 70-73° C. The operating point of a low concentration (0.1-0.5M), high-efficiency, cost-reduced DMFC (LFFC) 320, in which heat and water are recovered from the cell's exhaust stream, corresponds to an air stoichiometry of approximately 2.0, resulting in a stack temperature of 83-86° C. Thus, by transferring heat and water from the air exhaust channel to the air intake channel, the humidifier enables the high-efficiency, cost-reduced laminar flow fuel cell (LFFC) to operate at a lower air stoichiometry, which may lead to an increase in the fuel cell stack temperature.

Figure 4:
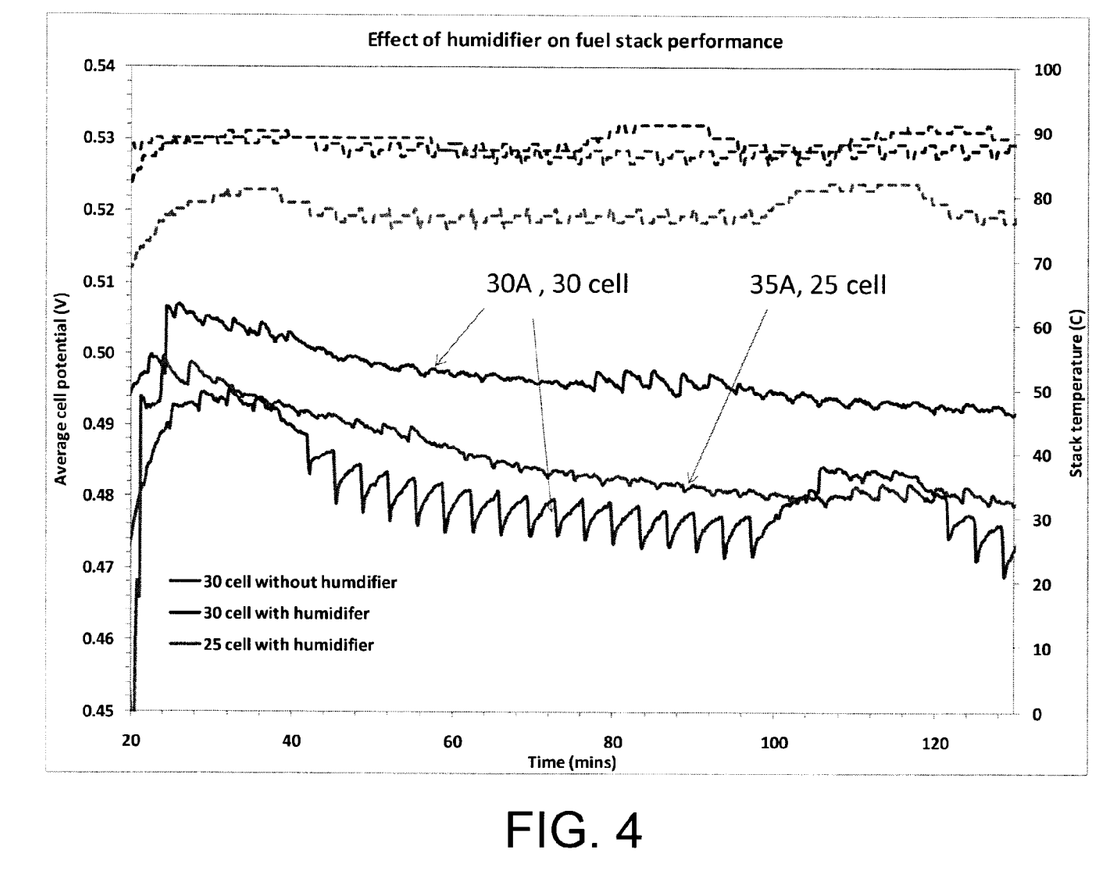
FIG. 4 is a graph of the effect of a humidifier on the average potential of a direct methanol fuel cell stack.

FIG. 4 is a graph of the effect of a humidifier on the average potential of a LFFC fuel cell stack. The average cell potentials (left axis) are indicated by solid lines, while the fuel cell stack temperatures (right axis) are indicated by dotted lines. The average cell potential and stack temperature are shown as a function of time for (i) a 30-cell stack operating at 30 amperes (A) with no humidifier, (ii) a 30-cell stack operating at 30 A with a humidifier, and (iii) a 25-cell stack operating at 35 A with a humidifier. Each experiment had identical fluid flow, a fuel efficiency of 80% (constant feed), and an air stoichiometry of 2.0 relative to the fuel feed rate. The results indicate that the incorporation of a cross-flow humidifier raises the fuel cell stack temperature and enables a stack having 25 cells to produce a higher current density than a stack having 30 cells, but no humidifier, at a similar average cell potential.

The 30-cell stack having no humidifier produced a current of 30 A and an average cell potential of 0.469-0.495 V while operating at a temperature of 70-82° C. The 30-cell stack with a humidifier produced a current of 30 A and an average cell potential of 0.492-0.507 V while operating at a temperature of 82-91° C. The 25-cell stack with a humidifier produced a current of 35 A and an average cell potential of 0.478-0.500 V while operating at a temperature of 85-91° C. Each of the preceding ranges correspond to temperature and potential values which were observed from approximately 25 minutes to 130 minutes of operation. These results show that (1) the inclusion of a humidifier may increase the temperature of the fuel cell stack, (2) the inclusion of a humidifier may increase the average cell potential by increasing the temperature of the air intake stream, (3) the inclusion of a humidifier may increase the stability of the average cell potential, for example, by reducing the magnitude of internal temperature fluctuations and/or by reducing the build up of liquid water within the cells, and (4) a stack having a humidifier and fewer cells may perform equally to or better than a stack having more cells but no humidifier. As a result, FIG. 4 indicates that the inclusion of a humidifier may allow the cost of a fuel cell to be reduced, for example, by decreasing the number of cells in the stack, while maintaining an equal average cell potential and increasing the current density.

Figure 5:
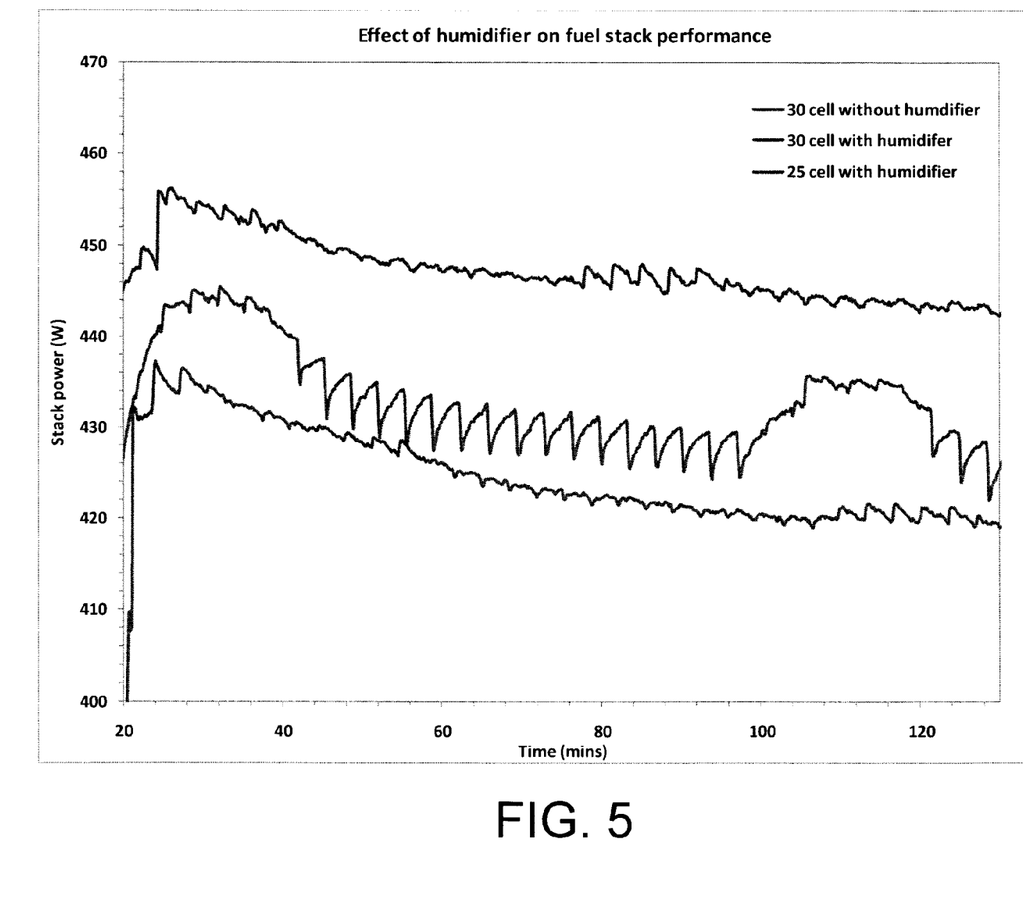
FIG. 5 is a graph of the effect of a humidifier on the power output of a direct methanol fuel cell stack.

FIG. 5 is a graph of the effect of a humidifier on the power output of a LFFC fuel cell stack. The average stack power is shown as a function of time for (i) a 30-cell LFFC stack operating at 30 A with no humidifier, (ii) a 30-cell stack operating at 30 A with a humidifier, and (iii) a 25-cell stack operating at 35 A with a humidifier. Each experiment had identical fluid flow, a fuel efficiency of 80%, and an air stoichiometry of 2.0. The results indicate that the incorporation of a cross-flow humidifier may increase the power output of a LFFC fuel cell stack. In addition, the results indicate that the cost and weight of a fuel cell stack may be reduced, while retaining similar power output, by incorporating a cross-flow humidifier.

Each of the following ranges corresponds to power output values which were observed from approximately 25 minutes to 130 minutes of operation. The 30-cell stack having no humidifier produced approximately 422 to 445 watts of relatively noisy power. The 30-cell stack with a humidifier produced approximately 442 to 456 watts of relatively stable power. The 25-cell stack with a humidifier produced approximately 419 to 438 watts of relatively stable power. Consequently, while the 30-cell stack with a humidifier significantly outperformed the 30-cell stack having no humidifier, the power output of the 25-cell stack with a humidifier was nearly equal to the power output of the 30-cell stack having no humidifier and was more stable over time. Moreover, the addition of a humidifier and removal of 5 cells represents an $800 cost reduction and 400 g weight reduction over the 30-cell stack having no humidifier.

EXAMPLES

Figure 6:
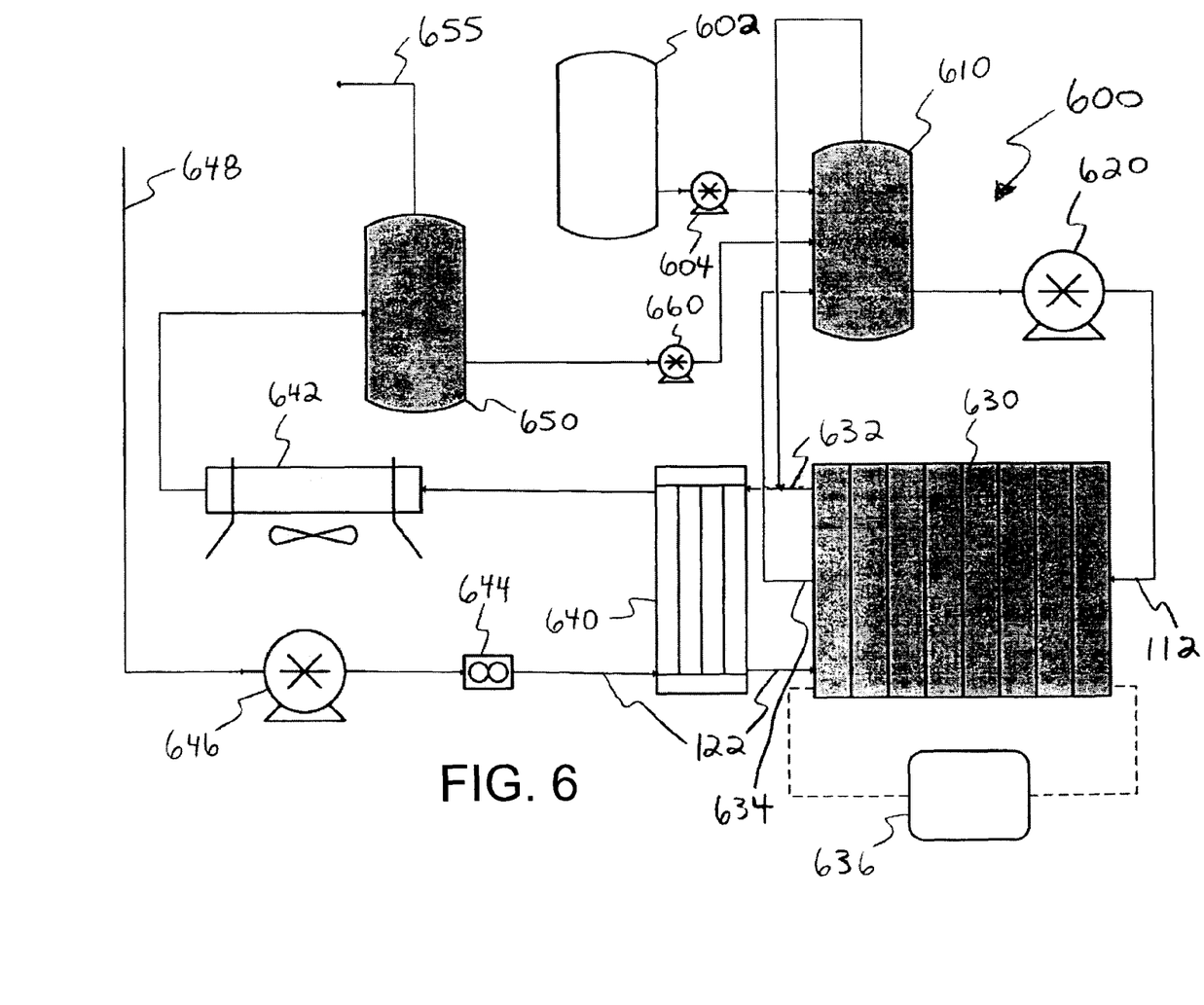
FIG. 6 illustrates a block diagram of a direct methanol fuel system with a humidifier.

FIG. 6 illustrates a block diagram of a direct methanol fuel system with a humidifier having aspects of the present invention. The direct methanol fuel system 600 includes a fuel container 602, a fuel pump 604, a first fluid reservoir 610, a fluid pump 620, a fuel cell stack 630, a humidifier 640, a heat exchanger 642, a mass flow sensor 644, an air pump 646, an air source 648, a second fluid reservoir 650, a reservoir exhaust 655, and a water makeup pump 660. The fuel cell stack 630 includes a fuel inlet 112, an air intake channel 122, an effluent gas channel 632, an aqueous effluent channel 634, and an electronic control unit 636. The electronic control unit 636 includes a battery (not shown in FIG. 6).

The fuel container 602 is in fluid connection with the fuel pump 604. The fuel pump 604 is in fluid connection with the first fluid reservoir 610. The first fluid reservoir 610 is in fluid connection with the fluid pump 620. The fuel inlet 112 fluidly connects the fluid pump 620 to the fuel cell stack 630. The effluent gas channel 632 fluidly connects the fuel cell stack 630 to the humidifier 640. The effluent gas channel 632 fluidly connects the first fluid reservoir 610 to the humidifier 640. The aqueous effluent channel 634 fluidly connects the fuel cell stack 630 to the first fluid reservoir 610. The electronic control unit 636 is in electrical communication with the fuel cell stack 630. The humidifier 640 is in fluid connection with the heat exchanger 642. The heat exchanger 642 is in fluid connection with the second fluid reservoir 650. The second fluid reservoir 650 is in fluid connection with the reservoir exhaust 655 and the water makeup pump 660. The water makeup pump 660 is in fluid connection with the first fluid reservoir 610. The air source 648 is fluidly connected to the air pump 646. The air pump 646 is fluidly connected to the mass flow sensor 644. The air intake channel 122 fluidly connects the mass flow sensor 644 to the humidifier 640. The air intake channel 122 fluidly connects the humidifier 640 to the fuel cell stack 630.

In operation, the fuel pump 604 pumps fuel from the fuel container 602 to the first fluid reservoir 610. Fuel entering the first fluid reservoir 610 may be mixed with an aqueous solution, such as an electrolyte, water, or a 1.0 M sulfuric acid solution in water. Preferably, the resultant fuel concentration is 0.1-0.5M. More preferably, the resultant fuel concentration is 0.1-0.3M. Even more preferably, the resultant fuel concentration is 0.1-0.25M. Most preferably, the resultant fuel concentration is 0.1-0.2M. At start-up of the direct methanol fuel system 600, the fuel/aqueous mixture preferably includes a higher concentration of fuel than that used during ongoing operation of the fuel cell stack 630. The fluid pump 620 pumps the fuel or fuel/aqueous mixture out of the first fluid reservoir 610, through the fuel inlet 112, and into the fuel cell stack 630. An oxidant is pumped from the air source 648 to the mass flow sensor 644 by the air pump 646. The mass flow sensor 644, in conjunction with the air pump 646 and the electronic control unit 636, controls the rate at which air passes through the humidifier 640 and air intake channel 122 and into the fuel cell stack 630. Preferably, the mass flow sensor 644 is a Honeywell® AWM720P1 Mass Airflow Sensor (distributed by NEWARK™, Chicago, Ill.). The air stoichiometry depends on the fuel used. Preferably, air is delivered to the fuel cell stack 630 at 1.0 to 3.0 times the stoichiometric amount. Even more preferably, air is delivered to the fuel cell stack 630 at 1.0 to 2.0 times the stoichiometric amount. Most preferably, air is delivered to the fuel cell stack 630 at 1.4-1.8 times the stoichiometric amount.

The delivery of the fuel/aqueous mixture and the air may occur simultaneously, or it may start with the delivery of one reagent first, followed by the other reagent after a time delay. The fuel is preferably soluble in water. More preferably, the fuel includes a water soluble, alcohol-based fuel, such as methanol or ethanol. Other fuels include organic acids, such as formic acid, and inorganic fuels, such as sodium borohydride and potassium borohydride used under alkaline conditions. Most preferably, the fuel includes methanol. Fuel may be delivered to the fuel cell stack 630 at 1.0-2.0 times the stoichiometric amount. More preferably, fuel is delivered to the fuel cell stack 630 at 1.0-1.5 times the stoichiometric amount. Most preferably, fuel is delivered to the fuel cell stack 630 at 1.1-1.2 times the stoichiometric amount.

The pH of the fuel cell stack 630 may vary from acidic to neutral to basic. Preferably, the fuel cell stack 630 is operated under acidic electrolyte conditions. Under acidic electrolyte conditions, as the fuel or fuel/aqueous mixture enters the fuel cell stack 630, it is oxidized to produce protons, electrons, and/or product gases. As the oxidant enters the fuel cell stack 630, it is reduced in the presence of protons and electrons, producing water in the liquid and/or vapor state. Depleted fuel and product liquids, such as water, are flowed through the aqueous effluent channel 634 to the first fluid reservoir 610.

Depleted oxidant and product gases/liquids, such as water vapor and liquid water, are flowed through the effluent gas channel 632 and into the heat exchanger 642.

As product gases and/or liquids in the effluent gas channel 632 pass through, or come into fluid contact with, the humidifier 640, the humidifier 640 extracts heat and/or water vapor from the effluent gas channel 632. The extracted heat and water are transferred through the humidifier 640 to the air intake channel 122, to warm and humidify the air flowing through the air intake channel 122 and into the fuel cell stack 630. By recovering a portion of the heat which would otherwise be exhausted from the direct methanol fuel system 600, the average operating temperature of the fuel cell stack 630 may be increased, improving reaction kinetics and thus improving the efficiency and performance of the fuel cell stack 630.

Preferably, the humidifier 640 also extracts fuel vapor present in the effluent gas channel 632. Fuel vapor which is extracted from the effluent gas channel 632 and passed to the air intake channel 122 may be burned at the cathode of the fuel cell stack 630. By recovering fuel vapor and burning it at the cathode, the amount of fuel vapor released into the surrounding environment may be decreased.

Due to the efficiency gains associated with recovering heat and water from the effluent gas channel 632, the platinum catalyst load of the fuel cell stack 630 may be decreased by as much as 25-50%, reducing the single greatest expense of the direct methanol fuel system 600 while maintaining a power output equal to that of a fuel cell operating without a humidifier. For example, a 25-cell stack operating with a humidifier 640 may output an amount of power which equals the output of a 30-cell stack operating without a humidifier 640. Thus, in addition to reducing the cost of the direct methanol fuel system 600, the size and weight of the system may be reduced.

The heat exchanger 642 may be air cooled, and the air is preferably at a lower temperature than the effluent gas from the fuel cell stack 630. Effluent gas and condensed liquids flow into the second fluid reservoir 650, where the gas may be vented through the exhaust 655 and into the surrounding environment. The liquids, such as water, are pumped into the first fluid reservoir 610 by the water makeup pump 660, where they may be mixed with fuel and an aqueous mixture. Gases present in the first fluid reservoir 610 may be flowed through the humidifier 640 and into the heat exchanger 642, where they may be condensed into liquids and flowed into the second fluid reservoir 650. Remaining gases are exhausted through the reservoir exhaust 655, and condensates may be pumped back into the first fluid reservoir 610 by the water makeup pump 660.

Figure 7:
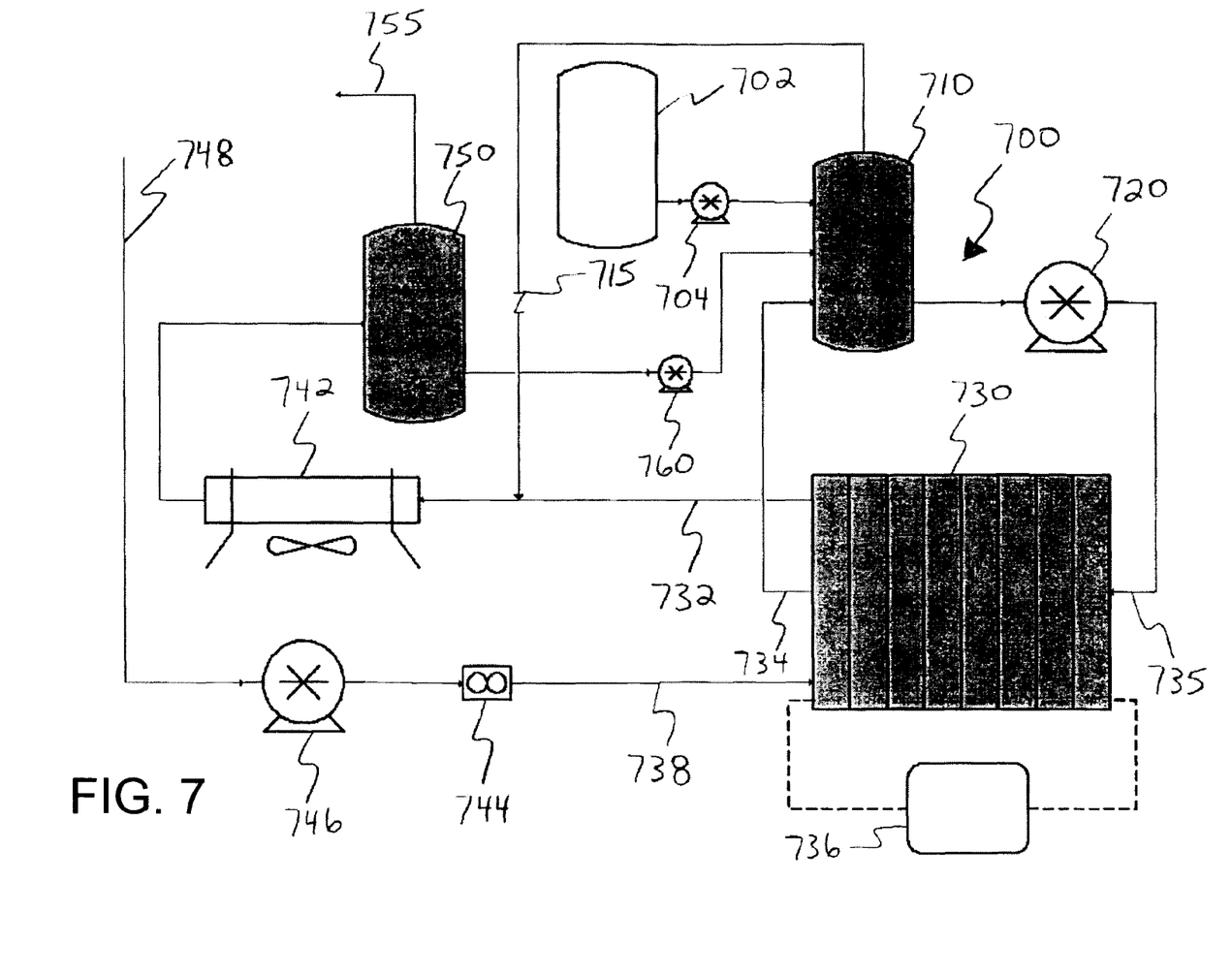
FIG. 7 illustrates a block diagram of a direct methanol fuel system without a humidifier.

FIG. 7 illustrates a block diagram of a direct methanol fuel system without a humidifier. The direct methanol fuel system 700 includes fuel container 702, a fuel pump 704, a first fluid reservoir 710, a check valve 715, a fluid pump 720, a fuel cell stack 730, a heat exchanger 742, a mass flow sensor 744, an air pump 746, an air source 748, a second fluid reservoir 750, a reservoir exhaust 755, and a water makeup pump 760. The fuel cell stack 730 includes an effluent gas channel 732, an aqueous effluent channel 734, a fuel inlet 735, an electronic control unit 736, and an air intake channel 738. The electronic control unit 736 includes a battery (not shown in FIG. 7).

The effluent gas channel 732 fluidly connects the fuel cell stack 730 to the heat exchanger 742. The aqueous effluent channel 734 fluidly connects the fuel cell stack 730 to the first fluid reservoir 710. The first fluid reservoir 710 is fluidly connected to the heat exchanger 742 through the effluent gas channel 732. The check valve 715 allows fluid to flow from the first fluid reservoir 710 to the heat exchanger 742, but prevents fluid from flowing from the heat exchanger 742 or fuel cell stack 730 towards the first fluid reservoir 710. The air source 748 is fluidly connected to the air pump 746. The air pump 746 is fluidly connected to the mass flow sensor 744. The air intake channel 738 fluidly connects the mass flow sensor 744 to the fuel cell stack 730.

At startup of the direct methanol fuel system 700 without a humidifier, the fuel cell stack 730 and air source 748 may be cool. Consequently, time is required for the platinum-mediated catalytic reactions to generate enough heat for the fuel cell stack 730 to reach its operational temperature. The duration of time required to reach the system's operational temperature is dependent on the temperature of the surrounding environment, the temperature of the air source 748, and the size of and number of cells contained within the fuel cell stack 730.

Because the direct methanol fuel system 700 illustrated in FIG. 7 does not include a humidifier, heat, water and fuel vapor are not recovered from the product gases and/or liquids in the effluent gas channel 732. Instead, heat, water, and fuel vapor may pass out of the fuel cell stack 730, through the reservoir exhaust 755, and into the surrounding environment. Consequently, the fuel cell stack 730 may operate at a lower average temperature than the direct methanol fuel system 600 having a humidifier 640, decreasing reaction kinetics and fuel cell performance. Additionally, the fuel cell stack 730 may be more susceptible to decreased performance and/or failure caused by dehydration when operated in low-humidity conditions. Furthermore, by releasing fuel vapor into the surrounding environment, operation of the system may create health and safety concerns.

Figure 8:
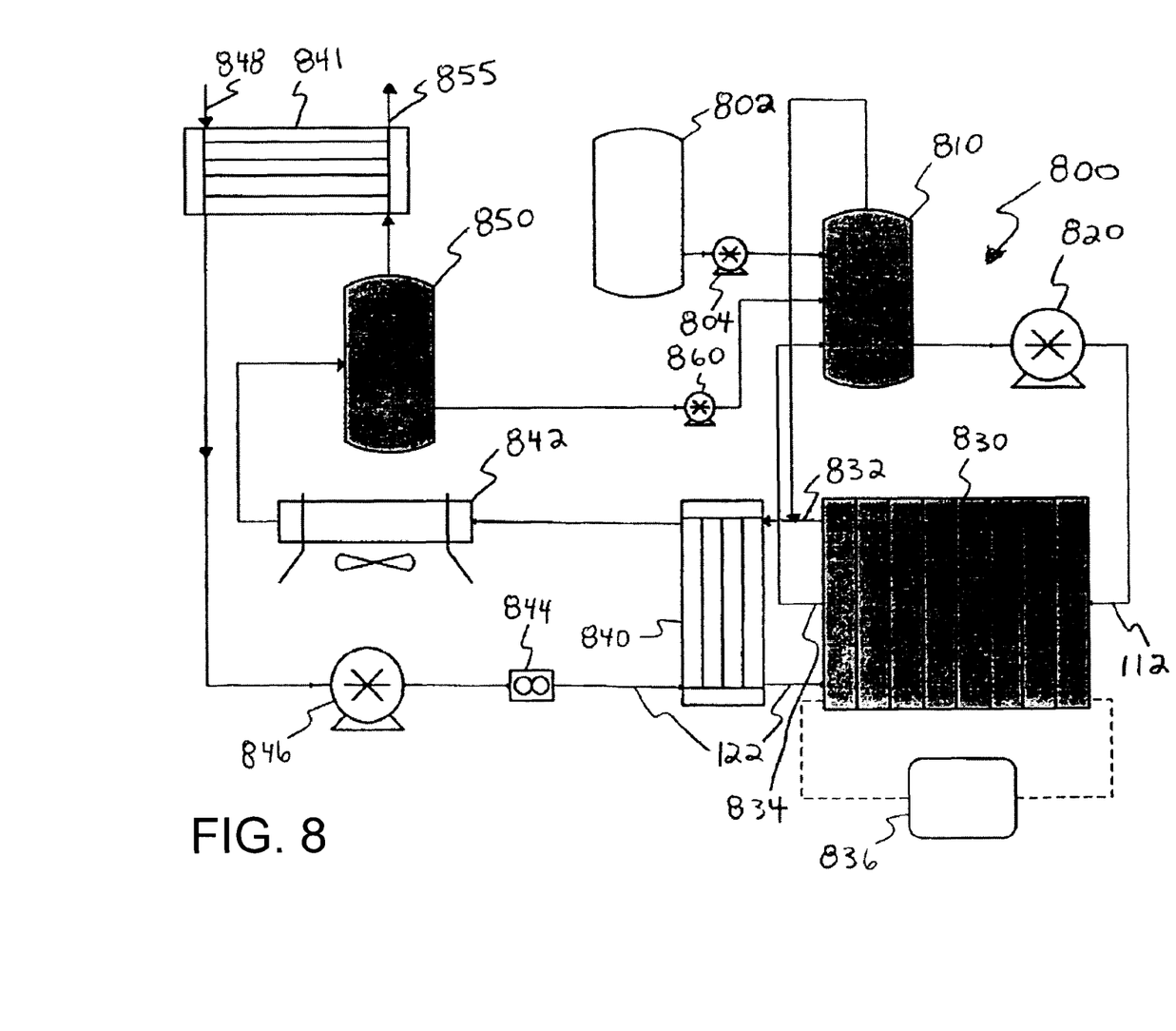
FIG. 8 illustrates a block diagram of a direct methanol fuel system with dual humidifiers.

FIG. 8 illustrates a block diagram of a direct methanol fuel system with dual humidifiers having aspects of the present invention. The direct methanol fuel system 800 includes a fuel container 802, a fuel pump 804, a first fluid reservoir 810, a fluid pump 820, a fuel cell stack 830, a first humidifier 840, a second humidifier 841, a heat exchanger 842, a mass flow sensor 844, an air pump 846, an air source 848, a second fluid reservoir 850, a reservoir exhaust 855, and a water makeup pump 860. The fuel cell stack 830 includes a fuel inlet 112, an air intake channel 122, an effluent gas channel 832, an aqueous effluent channel 834, and an electronic control unit 836. The electronic control unit 836 includes a battery (not shown in FIG. 6).

The fuel container 802 is in fluid connection with the fuel pump 804. The fuel pump 804 is in fluid connection with the first fluid reservoir 810. The first fluid reservoir 810 is in fluid connection with the fluid pump 820. The fuel inlet 112 fluidly connects the fluid pump 820 to the fuel cell stack 830. The effluent gas channel 832 fluidly connects the fuel cell stack 830 to the first humidifier 840. The effluent gas channel 832 fluidly connects the first fluid reservoir 810 to the first humidifier 840. The aqueous effluent channel 834 fluidly connects the fuel cell stack 830 to the first fluid reservoir 810. The electronic control unit 836 is in electrical communication with the fuel cell stack 830. The first humidifier 840 is in fluid connection with the heat exchanger 842. The heat exchanger 842 is in fluid connection with the second fluid reservoir 850. The second fluid reservoir 850 is in fluid connection with the second humidifier 841 and the water makeup pump 860. The second humidifier 841 is in fluid connection with the reservoir exhaust 855. The water makeup pump 860 is in fluid connection with the first fluid reservoir 810. The air source 848 is in fluid connection with the second humidifier 841. The second humidifier 841 is fluidly connected to the air pump 846. The air pump 846 is fluidly connected to the mass flow sensor 844.

The air intake channel 122 fluidly connects the mass flow sensor 844 to the first humidifier 840. The air intake channel 122 fluidly connects the first humidifier 840 to the fuel cell stack 830.

Preferably, one end of the second humidifier 841 is between the second fluid reservoir 850 and the reservoir exhaust 855, while the other end of the second humidifier 841 is between the air source 848 and the air pump 846. However, the second humidifier 841 may be located in a variety of positions. For example, one end of the second humidifier 841 may be between the second fluid reservoir 850 and the reservoir exhaust 855, while the other end of the second humidifier 841 is between the air pump 846 and the mass flow sensor 844. In another example, one end of the second humidifier 841 may be between the second fluid reservoir 850 and the reservoir exhaust 855, while the other end of the second humidifier 841 is between the mass flow sensor 844 and the first humidifier 840. In yet another example, one end of the second humidifier 841 may be between the heat exchanger 842 and the second fluid reservoir 850, while the other end of the second humidifier 841 is between the air pump 846 and the mass flow sensor 844.

In operation, the fuel pump 804 pumps fuel from the fuel container 802 to the first fluid reservoir 810. Fuel entering the first fluid reservoir 810 may be mixed with an aqueous solution, such as an electrolyte, water, or a 1.0 M sulfuric acid solution in water. At start-up of the direct methanol fuel system 800, the fuel/aqueous mixture preferably includes a higher concentration of fuel than that used during ongoing operation of the fuel cell stack 830. The fluid pump 820 pumps the fuel or fuel/aqueous mixture out of the first fluid reservoir 810, through the fuel inlet 112, and into the fuel cell stack 830. The air pump 846 pumps oxidant from the air source 848, through the second humidifier 841, to the mass flow sensor 844. The mass flow sensor 844, in conjunction with the air pump 846 and the electronic control unit 836, controls the rate at which air passes through the air intake channel 122 and into the fuel cell stack 830. Preferably, the mass flow sensor 844 is a Honeywell® AWM720P1 Mass Airflow Sensor (distributed by NEWARK™, Chicago, Ill.). The air stoichiometry depends on the fuel used. Preferably, air is delivered to the fuel cell stack 830 at 1.0 to 3.0 times the stoichiometric amount. Even more preferably, air is delivered to the fuel cell stack 830 at 1.0 to 2.0 times the stoichiometric amount. Most preferably, air is delivered to the fuel cell stack 830 at 1.4-1.8 times the stoichiometric amount.

As product gases and/or liquids in the effluent gas channel 832 pass through, or come into fluid contact with, the first humidifier 840, the first humidifier 840 extracts heat and/or water vapor from the effluent gas channel 832. The extracted heat and water are transferred through the first humidifier 840 to the air intake channel 122, to warm and humidify the air flowing through the air intake channel 122 and into the fuel cell stack 830. By recovering a portion of the heat which would otherwise be exhausted from the direct methanol fuel system 800, the average operating temperature of the fuel cell stack 830 may be increased, improving reaction kinetics and thus improving the efficiency and performance of the fuel cell stack 830.

Preferably, the first humidifier 840 also extracts fuel vapor present in the effluent gas channel 832. Fuel vapor which is extracted from the effluent gas channel 832 and passed to the air intake channel 122 may be burned at the cathode of the fuel cell stack 830. By recovering fuel vapor and burning it at the cathode, the amount of fuel vapor released into the surrounding environment may be decreased.

The heat exchanger 842 may be air cooled, and the air is preferably at a lower temperature than the effluent gas from the fuel cell stack 830. Effluent gas and condensed liquids flow into the second fluid reservoir 850. The effluent gas, which may be fully saturated with water vapor, flows out of the second fluid reservoir 850 and into the second humidifier 841, where water, heat, and/or fuel vapor may be extracted. The extracted heat and water are transferred through the second humidifier 841 to the air source 848, to warm and humidify the air flowing through the air pump 846 and into the fuel cell stack 830. The extracted fuel vapor may be transferred through the second humidifier 841, to the air source 848, allowing the fuel vapor to be oxidized by the fuel cell stack 830.

Liquids present in the second fluid reservoir 850, such as water, are pumped into the first fluid reservoir 810 by the water makeup pump 860, where they may be mixed with fuel and an aqueous mixture. Gases present in the first fluid reservoir 810 may be flowed through the first humidifier 840 and into the heat exchanger 842, where they may be condensed into liquids and flowed into the second fluid reservoir 850. Remaining gases flow through the second humidifier 841, where water, heat, and/or fuel vapor may be extracted. Remaining gases are exhausted through the reservoir exhaust 855, while condensates may be pumped back into the first fluid reservoir 810 by the water makeup pump 860.

By transferring water, heat, and/or fuel vapor from the reservoir exhaust 855 to the air source 848, the second humidifier 841 may increase the temperature and humidity of the air source 848 and decrease the amount of fuel vapor exhausted into the surrounding environment. Furthermore, by recovering a portion of the water which may otherwise be exhausted into the surrounding environment, the first and second humidifiers 840, 841 may enable the direct methanol fuel system 800 to operate in low-humidity environments without experiencing dehydration issues and without the need for water-diluted fuels.

What is claimed is:

1. A fuel cell, comprising:
   (a) a direct liquid fuel cell, comprising:
      (i) an anode,
      (ii) a cathode,
      (iii) an electrolyte, between the anode and the cathode,
      (iv) a fuel inlet, in contact with the anode, for providing fuel to the anode;
      (v) a fuel outlet, in contact with the anode and in fluid connection with the fuel inlet, for removing depleted fuel and/or product gases from the anode;
      (vi) an air inlet, in contact with the cathode, for providing oxidant to the cathode; and
      (vii) a air outlet, in contact with the cathode and in fluid connection with the air inlet, for exhausting depleted oxidant and product gases/liquids from the cathode; and
   (b) a humidifier;
   wherein the humidifier forms a fluid connection between the air intake channel and the air outlet; and
   the humidifier transfers fuel from the air outlet to the air inlet.

2. The fuel cell of claim 1, wherein the direct liquid fuel cell comprises a direct methanol fuel cell.

3. The fuel cell of claim 1, wherein the humidifier is a cross-flow humidifier.

4. The fuel cell of claim 1, wherein the humidifier has a parallel flow field design.

5. The fuel cell of claim 1, wherein the direct liquid fuel cell is capable of generating at least 100 watts.

6. The fuel cell of claim 1, wherein the direct liquid fuel cell is capable of generating at least 300 watts.

7. The fuel cell of claim 1, wherein the air stoichiometry of the fuel cell is from 1.0 to 3.0.

8. The fuel cell of claim 1, wherein the air stoichiometry of the fuel cell is from 1.0 to 2.0.

9. The fuel cell of claim 1, wherein the air stoichiometry of the fuel cell is from 1.0 to 1.7.

10. The fuel cell of claim 1, wherein the fuel comprises methanol.

11. The fuel cell of claim 1, wherein the fuel comprises sodium borohydride or potassium borohydride.

12. The fuel cell of claim 1, wherein the fuel cell produces a current density of at least 50 mA/cm$^2$ at an air stoichiometry of at most 3.0.

13. The fuel cell of claim 1, wherein the fuel cell produces a current density of at least 100 mA/cm$^2$ at an air stoichiometry of at most 3.0.

14. The fuel cell of claim 1, wherein the fuel cell produces a current density of at least 150 mA/cm$^2$ at an air stoichiometry of at most 3.0.

15. The fuel cell of claim 1, wherein the fuel cell produces a current density of at least 200 mA/cm$^2$ at an air stoichiometry of at most 3.0.

16. The fuel cell of claim 1, wherein the humidifier transfers water from the air outlet to the air inlet.

17. The fuel cell of claim 16, wherein at least a portion of the water is in a gaseous phase.

18. The fuel cell of claim 1, wherein the humidifier transfers heat from the air outlet to the air inlet.

19. The fuel cell of claim 1, wherein the direct liquid fuel cell is capable of generating at least 50 watts.

* * * * *

UNITED STATES PATENT AND TRADEMARK OFFICE
CERTIFICATE OF CORRECTION

| | | |
|---|---|---|
| PATENT NO. | : 9,065,095 B2 | Page 1 of 1 |
| APPLICATION NO. | : 13/334929 | |
| DATED | : June 23, 2015 | |
| INVENTOR(S) | : Markoski et al. | |

It is certified that error appears in the above-identified patent and that said Letters Patent is hereby corrected as shown below:

On the Title Page:

Item (56)

Page 3.

Column 2, Line 4, after Halliday delete ".".

Page 4.

Column 1, Line 26, delete "$YBa_2Cu_3O_7$." and insert --$YBa_2Cu_3O_{7.*}$--

Column 2, Line 49, delete "of Power of Sources" and insert --of Power Sources--

In the Claims:

Column 12, Line 51, Claim 1, delete "a" and insert --an--

Column 12, Line 57, Claim 1, delete "intake channel" and insert --inlet--

Signed and Sealed this
Sixteenth Day of August, 2016

Michelle K. Lee
*Director of the United States Patent and Trademark Office*